United States Patent [19]

Rubin

[11] Patent Number: 4,925,548
[45] Date of Patent: May 15, 1990

[54] SYNTHESIS OF CRYSTALLINE ZSM-35 STRUCTURE

[75] Inventor: Mae K. Rubin, Bala Cynwyd, Pa.

[73] Assignee: Mobil Oil Corp., New York, N.Y.

[21] Appl. No.: 379,308

[22] Filed: Jul. 13, 1989

[51] Int. Cl.$^5$ .............................................. C10G 1/00
[52] U.S. Cl. ..................................... 208/46; 423/279; 423/326; 423/328; 423/329; 423/593
[58] Field of Search ................. 208/46; 423/279, 326, 423/328, 329, 593

[56] References Cited

U.S. PATENT DOCUMENTS

| | | | |
|---|---|---|---|
| 4,016,245 | 4/1977 | Plank et al. | 423/328 |
| 4,107,195 | 8/1978 | Rollmann | 260/448 C |
| 4,151,189 | 4/1979 | Rubin et al. | 260/448 |
| 4,296,083 | 10/1981 | Rollmann | 423/329 |
| 4,439,409 | 3/1984 | Puppe et al. | 423/328 |
| 4,584,286 | 4/1986 | Valyocsik | 502/62 |

OTHER PUBLICATIONS

Lok et al., "The Role of Organic Molecules in Molecular Sieve Synthesis", 3 Zeolites, 282, (1983).

*Primary Examiner*—John Doll
*Assistant Examiner*—R. Bruce Breneman
*Attorney, Agent, or Firm*—Alexander J. McKillop; Charles J. Speciale; Dennis P. Santini

[57] ABSTRACT

This invention relates to a new form of crystalline material identified as ZSM-35, to a new and useful improvement in synthesizing said crystalline material and to use of said crystalline material prepared in accordance herewith as a catalyst for organic compound, e.g. hydrocarbon compound, conversion.

17 Claims, No Drawings

SYNTHESIS OF CRYSTALLINE ZSM-35 STRUCTURE

BACKGROUND OF THE INVENTION

1. Field of the Invention

This invention relates to a new and useful improvement in synthesizing the crystalline ZSM-35 structure, the new ZSM-35 synthesized, and to use of the crystalline material synthesized in accordance herewith as a catalyst component for organic compound, e.g. hydrocarbon compound, conversion.

More particularly, this invention relates to an improved method for preparing the crystalline ZSM-35 structure whereby synthesis is facilitated and reproducible and the product exhibits high purity and catalytic utility.

2. Discussion of the Prior Art

ZSM-35 and its conventional preparation are taught by U.S. Pat. No. 4,016,245, the entire disclosure of which is incorporated herein by reference. The templates taught to direct synthesis of ZSM-35 in U.S. Pat. No. 4,016,245 are cations derived from ethylenediamine or pyrrolidine. U.S. Pat. No. 4,107,195 shows synthesis of 100% crystalline ZSM-35 from a reaction mixture containing butanediamine as directing agent. U.S. Pat. No. 4,584,286 shows another method for synthesizing 100% crystalline ZSM-35 where the directing agent is a monomeric, diquaternary compound of bis(N-methylpyridyl)ethylinium.

A composition different from ZSM-35, i.e. "PSH-3", is taught to be directed by hexamethyleneimine in U.S. Pat. No. 4,439,409. European Patent Application No. 293,032 also shows use of hexamethylenimine to direct synthesis of a "PSH-3" composition containing various trivalent and tetravalent metals.

Lok et al. (3 Zeolites, 282–291 (1983) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of

$(CH_3)_2(C_2H_5)N^+(CH_2)_4N^+(C_2H_5)(CH_3)_2$ directing agent for synthesis of another novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of trimethylamine, triethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a particular assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4or6}N^+(CH_3)_2(C_2H_5)$ as directing agent for synthesis of ZSM-12. Synthesis of ZSM-5 is directed by the diquaternary (alkyl) (alkyl)$_3$N$^+$(CH$_2$)$_6$N$^+$(alkyl)$_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 have the same structure.

SUMMARY OF THE INVENTION

An improved, environmentally safer, more economical and reproducible method for preparing highly crystalline ZSM-35 exhibiting high purity, catalytic activity and other valuable properties is provided. The method comprises forming a reaction mixture hydrogel containing sources of alkali or alkaline earth metal cations M or mixtures thereof; an oxide of trivalent element X, e.g. aluminum, boron, iron, gallium, indium and mixtures thereof; an oxide of tetravalent element Y, e.g. silicon, germanium, tin and mixtures thereof; an organic directing agent R, hereinafter more particularly described; and water, said reaction mixture having a composition in terms of mole ratios, within the following ranges:

| Reactants | Useful | Preferred |
|---|---|---|
| $YO_2/X_2O_3$ | 15 to 35 | 18 to 35 |
| $H_2O/YO_2$ | 10 to 100 | 15 to 40 |
| $OH^-/YO_2$ | 0.15 to 0.50 | 0.18 to 0.30 |
| $M/YO_2$ | 0.15 to 0.50 | 0.18 to 0.30 |
| $R/YO_2$ | 0.1 to 1.0 | 0.30 to 0.50 |
| $R/M_2O$ | 0.5 to 3.6 | 0.9 to 3.6 |

The method further comprises maintaining the reaction mixture until crystals of ZSM-35 structure are formed. Reaction conditions required consist of heating the foregoing reaction mixture to a temperature of from about 80° C. to about 250° C. for a period of time of from about 16 hours to about 60 days. A more preferred temperature range is from about 100° C. to about 200° C. with the amount of time at a temperature in such range being from about 24 hours to about 8 days. The solid product comprising ZSM-35 crystals is recovered from the reaction medium, as by cooling the whole to room temperature, filtering and water washing.

EMBODIMENTS

The particular effectiveness of the presently required directing agent, hereafter more particularly described, when compared with other directing agents, such as those identified above, is believed due to its ability to function in the appropriate reaction mixture as a template in the nucleation and growth of highly crystalline ZSM-35. This is true even though no predigestion of the gel is required prior to crystallization. This different organic directing agent functions in this fashion in a reaction mixture having the above described composition.

It should be noted that the ratios of components of the reaction mixture required herein are critical to achieve maximum effectiveness. For instance, when the $YO_2/X_2O_3$ ratio is greater than 35, another crystal structure, such as ZSM-51, may result. When the $OH^-/YO_2$ or $M/YO_2$ ratio is less than 0.15, or when the $R/M_2O$ ratio is greater than about 3.6, another crystal structure, such as ZSM-51, may result.

It is preferred in the synthesis of the present invention to use seed crystals having the structure of ZSM-35. The use of at least 0.01%, preferably about 0.10%, and even more preferably up to about 5% seed crystals (based on weight of $YO_2$, e.g. silica) of ZSM-35 structure will result in pure product of highly crystalline ZSM-35.

The reaction mixture composition for the synthesis of synthetic crystalline ZSM-35 hereby can be prepared utilizing materials which can supply the appropriate oxide. The useful sources of $X_2O_3$, e.g. aluminum oxide, include, as non-limiting examples, any known form of such oxide, e.g. aluminum oxide or hydroxide, organic or inorganic salt or compound, e.g. alumina and aluminates. The useful sources of $YO_2$, e.g. silicon oxide, include, as non-limiting examples, known forms of such oxide, e.g. silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order for example, any oxide can be supplied by an aqueous solution. The reaction mixture can be prepared either batchwise or continuously. Crystal size and crystallization time for the product composition comprising ZSM-35 crystals will vary with the exact nature of the reaction mixture employed within the above limitations.

The organic directing agent required of the present synthesis method is hexamethyleneimine which has the following structure:

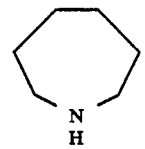

This directing agent has been found to effectively stabilize the developing crystal framework of ZSM-35 during hydrothermal synthesis from the appropriate reaction mixture.

The ZSM-35 composition as prepared hereby has a characteristic X-ray diffraction pattern, including the values set forth in Table 1, hereinafter.

TABLE 1

| Interplanar d-Spacing (A) | Relative Intensity $(I/I_o)$ |
|---|---|
| 9.6 ± 0.20 | vs–vvs |
| 7.10 ± 0.15 | m |
| 6.98 ± 0.14 | m |
| 6.64 ± 0.14 | m |
| 5.78 ± 0.12 | w |
| 5.68 ± 0.12 | w |
| 4.97 ± 0.10 | w |
| 4.58 ± 0.09 | w |
| 3.99 ± 0.08 | s |
| 3.94 ± 0.08 | m–s |
| 3.85 ± 0.08 | m |
| 3.78 ± 0.08 | s |
| 3.74 ± 0.08 | w |
| 3.66 ± 0.07 | m |
| 3.54 ± 0.07 | vs |
| 3.48 ± 0.07 | vs |
| 3.39 ± 0.07 | w |
| 3.32 ± 0.07 | w–m |
| 3.14 ± 0.06 | w–m |
| 2.90 ± 0.06 | w |
| 2.85 ± 0.06 | w |
| 2.71 ± 0.05 | w |
| 2.65 ± 0.05 | w |
| 2.62 ± 0.05 | w |
| 2.58 ± 0.05 | w |
| 2.54 ± 0.05 | w |
| 2.48 ± 0.05 | w |

These X-ray diffraction data were collected with a Phillips diffraction system, equipped with a graphite diffracted beam monochromator and scintillation counter, using copper K-alpha radiation. The diffraction data were recorded by step-scanning at 0.04 degrees of two-theta, where theta is the Bragg angle, and a counting time of 4 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40), w=weak (0–20) and etc. It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline material of ZSM-35 structure prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is greater than 8, usually from about 10 to about 50, more usually from about 15 to about 40. In the as-synthesized form, the material has a formula, on an anhydrous basis and in terms of moles of oxides per y moles of $YO_2$, as follows:

$$(0-0.6)M_2O(0.4-2.5)R_2O:X_2O_3:YO_2$$

wherein M and R are as defined above. The M and R components are associated with the material as a result of their presence during crystallization, and are easily removed by post-crystallization methods hereinafter more particularly described.

Synthetic ZSM-35 prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the ZSM-35 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-35, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized ZSM-35 can be prepared by heating same at a temperature of from about 200° C. to about 550° C. for from 1 hour to about 48 hours.

The original cations, e.g. alkali or alkaline earth metal, of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements.

Typical ion exchange technique would be to contact the synthetic ZSM-35 with a salt of the desired replacing cation or cations. Examples of such salts include the halides, e.g. chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the ZSM-35 is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline ZSM-35 prepared by the instant invention is formed in a wide variety of particle sizes. Generally speaking, the particles can be in the form of a powder, a granule, or a molded product, such as extrudate having particle size sufficient to pass through a Z mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the ZSM-35 hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjuction with the ZSM-35, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized ZSM-35 include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the ZSM-35 crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

While the improved crystalline material of the present invention may be used in a wide variety of organic compound, e.g. hydrocarbon compound, conversion reactions, it is notably useful in the processes of cracking, isomerization and reforming. Other conversion processes for which improved ZSM-35 may be utilized in one or more of its active forms include, for example, dewaxing.

Catalyst comprising the present ZSM-35 can also be used for manufacturing lube base stocks from light neutral feedstock at a temperature of from about 400° F. to about 850° F., preferably from about 500° F to about 700° F., a liquid hourly space velocity of from about 0.1 $hr^{-1}$ to about 20 $hr^{-1}$, preferably from about 0.2 $hr^{-1}$ to about 4 $hr^{-1}$ and a pressure of from about 0 psia to about 3000 psia, preferably from about 100 to about 1000 psia. The hydrogen circulation rate for this process is from about 500 to about 5000 standard cubic feet of hydrogen per barrel of feedstock (SCF/B). Representative examples of such a lube base stock manufacturing process include those taught in U.S. Pat. Nos. 3,960,705 and 4,259,170, the disclosures of which are incorporated herein by reference.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of absorbate vapor controlled by a manostat during the adsorption period, which did not exceed about 8 hours. As adsorbate was adsorbed by the sorbant material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). The Alpha Test is described in U.S. Pat. No. 3,354,078; in the *Journal of Catalysis*, Vol 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLES 1-5

Five experiments which demonstrate the present invention, including the preferred embodiment involving the use of seed crystals, are detailed in Table 2. In each of these five experiments, labeled Examples 1-5, hexamethyleneimine, hereinafter "HMI", was used as the directing agent. Ultrasil silica was the source of $YO_2$ and aluminum sulphate was the source of $X_2O_3$. A 50% solution of NaOH and water was used. Seed crystals of ZSM-35 structure were used in Examples 4 and 5. Crystallization temperature was maintained at 150° C. with stirring during reaction.

Products from these experiments were filtered, washed with water and dried at 120° C. Samples were analyzed by X-ray diffraction studies, which proved each to comprise highly crystalline ZSM-35, i.e. greater than 100% crystallinity compared to a standard ZSM-35 sample. The products of Examples 1-3 and 5 also contained some unidentified crystals, while the product of Example 4 was pure ZSM-35.

X-ray diffraction patterns for the product of Example 4 as-synthesized and after calcination at 540° C. for 6 hours included the values shown in Tables 3 and 4, respectively.

TABLE 2

|  | Example | | | | |
|---|---|---|---|---|---|
|  | 1 | 2 | 3 | 4 | 5 |
| Reaction Mixture (mole ratios) | | | | | |
| $SiO_2/Al_2O_3$ | 30.1 | 30.1 | 26.2 | 30.1 | 30.1 |
| $OH^-/SiO_2$ | 0.18 | 0.18 | 0.21 | 0.18 | 0.18 |
| $Na/SiO_2$ | 0.18 | 0.18 | 0.21 | 0.18 | 0.18 |
| $HMI/SiO_2$ | 0.35 | 0.35 | 0.80 | 0.35 | 0.18 |
| $H_2O/SiO_2$ | 19.4 | 18.7 | 25.4 | 19.4 | 19.4 |
| $HMI/Na_2O$ | 1.85 | 1.86 | 3.64 | 1.86 | 0.93 |
| $N/Al_2O_3$ | 10.6 | 10.5 | 21.0 | 10.6 | 5.3 |
| ZSM-35 Seeds, wt. % | No | No | No | 1.8 | 1.8 |
| Reaction Time, Days | 7 | 8 | 7 | 7 | 7 |
| Product X-ray | ZSM-35 135% tr. UCM | ZSM-35 >100% tr. UCM | ZSM-35 >100% tr. UCM | ZSM-35 150% | ZSM-35 145% possible |

TABLE 2-continued

| | Example | | | | |
|---|---|---|---|---|---|
| | 1 | 2 | 3 | 4 | 5 |
| | | | | | tr. of cristobalite |
| Product Comp., wt. % | | | | | |
| N | 1.84 | 2.03 | 1.85 | 1.89 | 1.72 |
| Na | 0.33 | 0.21 | 0.45 | 0.46 | 0.37 |
| $Al_2O_3$ | 6.6 | 4.0 | 6.5 | 5.8 | 5.7 |
| $SiO_2$ | 75.9 | 75.6 | 78.7 | 78.4 | 79.4 |
| Ash | 81.47 | 80.3 | 82.5 | 79.8 | 85.1 |
| $SiO_2/Al_2O_3$, mole ratio | 19.6 | 32.1 | 20.6 | 23.0 | 23.7 |
| Adsorption, wt. % (after calcination at 540° C. for 6 hours) | | | | | |
| Cyclohexane | 2.8 | 4.0 | 4.7 | 3.9 | 3.2 |
| n-Hexane | 7.5 | 9.6 | 10.2 | 9.4 | 8.1 |
| Water | 8.7 | 8.5 | 11.0 | 9.9 | 10.4 |
| Surface Area, $m^2/gm$ | 283 | 306 | 290 | 258 | 246 |

TABLE 3
Example 4 Product As-Synthesized

| Interplanar d-Spacings (A) | Observed 2 × Theta | Relative Intensities ($I/I_o$) |
|---|---|---|
| 13.32 | 6.63 | 2 |
| 11.28 | 7.84 | 2 |
| 9.48 | 9.32 | 52 |
| 6.92 | 12.80 | 15 |
| 6.58 | 13.45 | 10 |
| 5.77 | 15.35 | 6 |
| 4.96 | 17.89 | 9 |
| 4.51 | 19.68 | 2 |
| 3.99 | 22.77 | 70 |
| 3.86 | 23.02 | 24 |
| 3.78 | 23.52 | 57 |
| 3.68 | 24.20 | 37 |
| 3.54 | 25.17 | 100 |
| 3.48 | 25.63 | 75 |
| 3.39 | 26.32 | 14 |
| 3.32 | 26.86 | 23 |
| 3.14 | 28.45 | 28 |
| 3.06 | 29.17 | 20 |
| 2.95 | 30.30 | 7 |
| 2.89 | 30.91 | 9 |
| 2.71 | 33.04 | 7 |
| 2.65 | 33.83 | 9 |
| 2.57 | 34.87 | 4 |
| 2.48 | 36.16 | 7 |
| 2.36 | 38.08 | 5 |
| 2.32 | 38.88 | 4 |
| 2.24 | 40.25 | 3 |
| 2.18 | 41.46 | 2 |
| 2.15 | 42.08 | 4 |
| 2.12 | 42.71 | 3 |
| 2.04 | 44.50 | 10 |
| 2.00 | 45.32 | 14 |
| 1.93 | 47.10 | 19 |
| 1.87 | 48.72 | 12 |
| 1.84 | 49.65 | 4 |
| 1.81 | 50.43 | 5 |
| 1.78 | 51.37 | 13 |
| 1.74 | 52.50 | 3 |
| 1.71 | 53.43 | 3 |
| 1.66 | 55.19 | 6 |
| 1.63 | 56.55 | 4 |
| 1.61 | 57.10 | 4 |
| 1.59 | 58.10 | 3 |
| 1.55 | 59.69 | 2 |

TABLE 4
Example 4 Product Calcined

| Interplanar d-Spacings (A) | Observed 2 × Theta | Relative Intensities ($I/I_o$) |
|---|---|---|
| 9.47 | 9.34 | 55 |
| 7.08 | 12.49 | 23 |
| 6.94 | 12.75 | 29 |
| 6.60 | 13.42 | 21 |
| 5.68 | 15.60 | 10 |
| 4.97 | 17.84 | 3 |
| 4.73 | 18.75 | 3 |
| 4.53 | 19.59 | 3 |
| 3.98 | 22.34 | 68 |
| 3.85 | 23.10 | 27 |
| 3.78 | 23.50 | 47 |
| 3.66 | 24.28 | 25 |
| 3.54 | 25.19 | 100 |
| 3.47 | 25.67 | 84 |
| 3.38 | 26.35 | 23 |
| 3.31 | 26.91 | 20 |
| 3.14 | 28.44 | 32 |
| 3.05 | 29.24 | 22 |
| 2.95 | 30.26 | 11 |
| 2.89 | 30.94 | 12 |
| 2.84 | 31.45 | 4 |
| 2.70 | 33.11 | 8 |
| 2.64 | 33.90 | 9 |
| 2.56 | 34.81 | 5 |
| 2.47 | 36.34 | 7 |
| 2.41 | 37.33 | 7 |
| 2.34 | 38.37 | 5 |
| 2.31 | 39.02 | 5 |
| 2.23 | 40.37 | 4 |
| 2.14 | 42.22 | 4 |
| 2.11 | 42.86 | 4 |
| 2.03 | 44.68 | 6 |
| 1.99 | 45.48 | 15 |
| 1.95 | 46.66 | 9 |
| 1.92 | 47.31 | 15 |
| 1.86 | 48.85 | 13 |
| 1.83 | 49.81 | 3 |
| 1.77 | 51.57 | 10 |
| 1.73 | 52.95 | 2 |
| 1.70 | 53.84 | 3 |
| 1.66 | 55.40 | 5 |
| 1.62 | 56.84 | 3 |
| 1.60 | 57.40 | 4 |
| 1.58 | 58.52 | 3 |
| 1.54 | 58.86 | 2 |

EXAMPLE 6

A portion of the product of Example 4 was calcined for 6 hours at 540° C., exchanged with ammonium chloride and again calcined to produce HZSM-35. The Alpha Value of this sample proved to be 140.

What is claimed is:

1. A method for synthesizing a crystalline material exhibiting a characteristic X-ray diffraction pattern including the values shown in Table 1 of the specification, which comprises (i) preparing a mixture capable of forming said material, said mixture comprising sources of alkali or alkaline earth metal cations (M), an oxide of trivalent element (X), an oxide of tetravalent element (Y), water and a directing agent (R), and having a composition, in terms of mole ratios, within the following ranges;

|  |  |
|---|---|
| $YO_2/X_2O_3$ | 15 to 35 |
| $H_2O/YO_2$ | 10 to 100 |
| $OH^-/YO_2$ | 0.15 to 0.5 |
| $M/YO_2$ | 0.15 to 0.5 |
| $R/YO_2$ | 0.1 to 1.0 |
| $R/M_2O$ | 0.5 to 3.6 | wherein R is an organic agent of the formula:

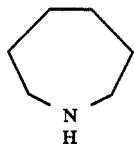

(ii) maintaining said mixture under sufficient conditions until crystals of said material are formed; and (iii) recovering said crystalline material from step (ii), said recovered crystalline material containing said R.

2. The method of claim 1 wherein said mixture has the following composition ranges:

|  |  |
|---|---|
| $YO_2/X_2O_3$ | 18 to 35 |
| $H_2O/YO_2$ | 15 to 40 |
| $OH^-/YO_2$ | 0.18 to 0.30 |
| $M/YO_2$ | 0.18 to 0.30 |
| $R/YO_2$ | 0.3 to 0.5 |
| $R/M_2O$ | 0.9 to 3.6 |

3. The method of claim 1 wherein said mixture further comprises seed crystals in sufficient amount to enhance synthesis of said crystalline material.

4. The method of claim 1 wherein said X is aluminum, boron, iron, gallium, indium or a mixture thereof, and said Y is silicon, germanium, tin or a mixture thereof.

5. The method of claim 1 wherein X comprises aluminum and Y comprises silicon.

6. The method of claim 1 comprising replacing cations of the crystalline material recovered in step (iii), at least in part, by ion exchange with a cation or a mixture of cations selected from the group consisting of hydrogen and hydrogen precursors, rare earth metals and metals from Groups IIA, IIIA, IVA, IB, IIB, IIIB, IVB, VIB and VIII of the Periodic Table of Elements.

7. The method of claim 2 comprising replacing cations of the crystalline material recovered in step (iii), at least in part, by ion exchange with a cation or a mixture of cations selected from the group consisting of hydrogen and hydrogen precursors, rare earth metals and metals from Groups IIA, IIIA, IVA, IB, IIB, IIIB, IVB, VIB and VIII of the Periodic Table of Elements.

8. The method of claim 6 wherein said replacing cation is hydrogen or a hydrogen precursor.

9. The method of claim 7 wherein said replacing cation is hydrogen or a hydrogen precursor.

10. The recovered crystalline material of claim 1.

11. The recovered crystalline material of claim 2.

12. The R-containing product crystalline material of claim 6.

13. The R-containing product crystalline material of claim 7.

14. The R-containing product crystalline material of claim 8.

15. The R-containing product crystalline material of claim 9.

16. A process for effecting catalytic conversion of an organic compound-containing feedstock which comprises contacting said feedstock under catalytic conversion conditions with a catalyst comprising an active form of the crystalline material of claim 10.

17. A process for effecting catalytic conversion of an organic compound-containing feedstock which comprises contacting said feedstock under catalytic conversion conditions with a catalyst comprising an active form of the crystalline material of claim 11.

* * * * *